Dec. 26, 1939.  G. W. WATSON  2,184,627
DUAL CURRENT CONDENSER WELDER
Filed July 15, 1937
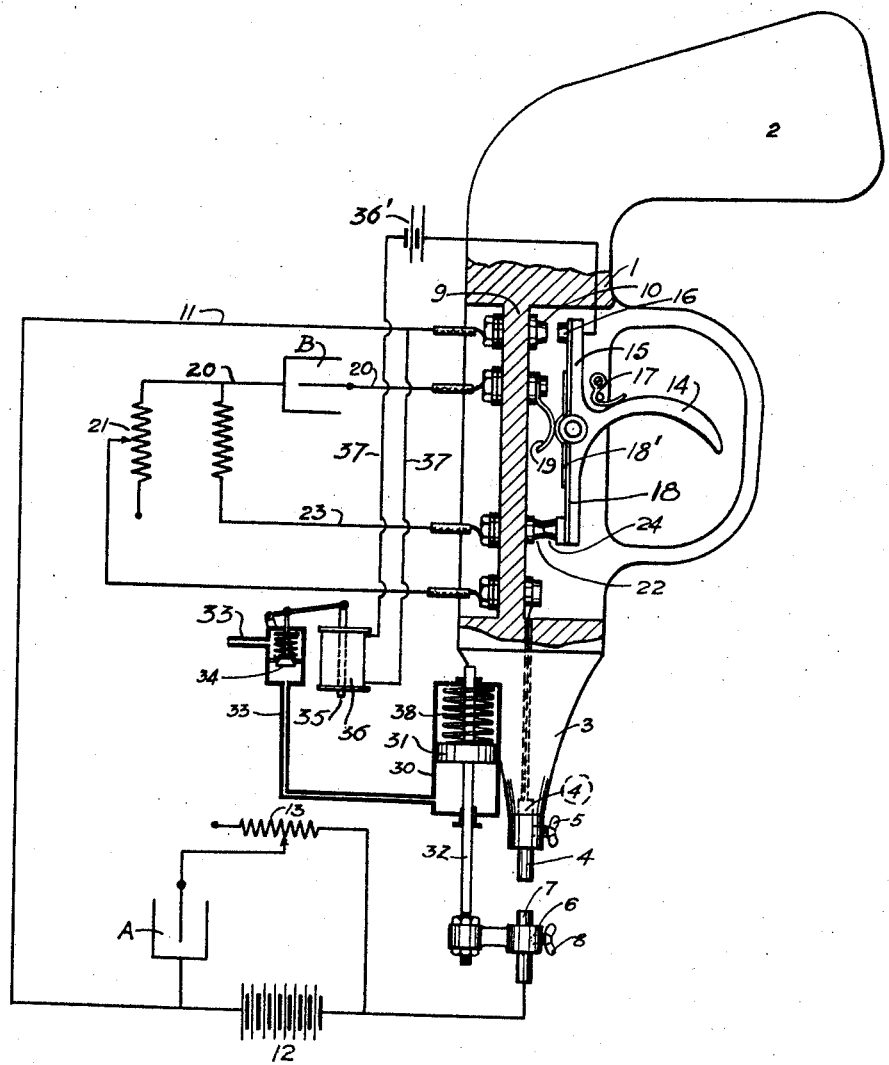
INVENTOR.
Glenn. W. Watson.
BY Samuel Weiseman
ATTORNEY.

Patented Dec. 26, 1939

2,184,627

UNITED STATES PATENT OFFICE 2,184,627

DUAL CURRENT CONDENSER WELDER

Glenn W. Watson, Detroit, Mich., assignor, by direct and mesne assignments, to Penweld Corporation, Detroit, Mich., a corporation of Michigan Application July 15, 1937, Serial No. 153,827

4 Claims. (Cl. 219—4)

The present invention pertains to improvements in the welding apparatus and method disclosed in my patent, No. 2,077,600, of April 20, 1937. In said patent a weld is made during the charging of a condenser, that is, the amount of current flowing into the weld and the duration of the current flow are limited by the capacity and other characteristics of a condenser in the circuit.

I have discovered that the weld is considerably improved if a second condenser is provided and connected in such a manner that it discharges into the weld at the same time that the first condenser becomes charged while the welding circuit is closed. Thus, the apparatus constituting the present invention embodies two condensers, or groups of condensers, one charging and the other discharging while the weld is being made.

The weld produced by this means is different from the weld produced by condensers of the same aggregate capacity mounted in a system according to the above mentioned patent, all charging while the weld is being made.

The theoretical basis of this phenomenon has not as yet been determined, but it is evident that the weld receives current simultaneously from two sources, namely, the primary current source and the condenser or group that has previously been charged. It has been shown that these two currents are out of phase with each other and combine to prolong the application of current to the weld at the peak voltage, resulting in a firmer and more efficient weld than could be produced by the same apparatus with the condensers differently arranged.

As already indicated by reference to my patent, No. 2,077,600, the amount of current taken by the weld directly from the primary source is limited by a condenser or group that becomes charged during welding. The apparatus includes, in the circuit, a tool or gun with a trigger and contacts adapted, in one position, to discharge the last named condenser or group externally of the weld, and in another position, to permit the primary current source to charge said condenser or group through the weld. The remaining condenser or group is so mounted as to be normally charged by the primary current source and to discharge into the weld while the trigger and contacts are in the last described position.

The invention may further include means whereby the last mentioned position of the trigger and contacts causes the electrodes to approach each other through the action of an electrically controlled air cylinder or equivalent apparatus. The invention is fully disclosed by way of example in the following description and in the accompanying drawing in which the figure illustrates the mechanical parts of the apparatus and shows the wiring diagrammatically.

The tool or gun comprises a body 1 with a handle 2 at one end and a tip 3 at the other end. In this tip is mounted one of the electrodes 4 adjustably held by the set screw 5. Opposite the tip 3 is a suitable electrode holder 6 in which is mounted another electrode 7 in line with the electrode 4 and adjustably held by the set screw 8.

Within the body 1 is formed a wall 9 for carrying various contacts as will presently appear. One of these contacts is designated by the numeral 10 and is connected, through the wall 9, to a main conductor 11 leading to the electrode 7. This conductor contains the primary current source 12 which is more commonly in the nature of an electric generator. Across the source is connected a condenser or group A, and in series therewith is a variable resistance 13 for regulating the quantity of current taken by the condenser or group A.

Adjacent to the wall 9 is pivotally mounted a trigger 14 having a cross piece 15 lying parallel to the wall. One end of the piece 15 carries a contact 16 adapted to engage the contact 9 on pulling the trigger. These contacts, however, are normally separated by the action of a spring 17 bearing the finger piece of the trigger. A conductor 18 is mounted on the back of the piece 15 and is in permanent engagement with a spring contact 19 carried by the wall 9, through a wear piece 18'. The latter is connected through the wall to one side of a condenser or group B, the other side of which is joined by a conductor 20 to the electrode 4. In the conductor 20 is mounted a variable resistance 21 for regulating the amount of current taken by the condenser or group B.

Still another fixed contact 22 is mounted in the body of the gun and is joined by a conductor 23 to the conductor 20 at a point between the variable resistance 21 and the condenser or group B. The contact 22 is normally engaged by another contact 24 mounted on the piece 15 and permanently engaged by the conducting strip 18.

It is desirable to automatically bring the electrodes 4 and 7 together on pulling the trigger 14 to close the welding circuit. Accordingly, there is provided an air cylinder 30 with a piston 31 slidable therein. The rod 32 of the piston is rigidly connected to the electrode 7 to move it with the piston. An air line 33 extends to the cylinder and is equipped with a valve 34. The valve in turn is rigidly connected to the moving plunger 35 of a solenoid 36, and the parts are so mounted that the valve is opened when the solenoid is energized. The ends of the solenoid are joined respectively to the contacts 10 and 16 by conductors 37.

In the operation of the device, the work is placed between the electrodes in the usual manner and is pressed by the electrode 7 against the electrode 4 on closing the solenoid circuit through its independent current source 36' by pulling the trigger 14. At this time, the contacts 10 and 16 are also brought together. A circuit is thus completed from electrode 7 through the source 12, conductor 11, contacts 10 and 16, strip 18, contact 19, conductor 20, condenser or group B, variable resistance 21 to electrode 4 and through the work to electrode 7. The source 12 delivers current to the electrodes and the work but only to the extent permitted by the capacity of condenser or group B as fully set forth in my patent, No. 2,077,600. At the same time, the condenser or group A which is normally charged by the source, also discharges into the electrodes and weld inasmuch as it is comprised in the closed circuit outlined above.

When the trigger 14 is released, the spring 17 separates the contacts 10 and 16 to break the welding circuit and also brings the contacts 22 and 24 together. The charged condenser or group B is thereupon discharged through a closed circuit comprising conductors 20 and 23, contacts 22 and 24, conducting strip 18 and conductor 19. The discharging of condenser or group B prepares it for its function in limiting or measuring the flow of current from the source 12 into the work by becoming charged when the welding circuit is closed by pulling the trigger.

On separation of the contacts 10 and 16, the valve 34 in line 33 closes, and a spring 38 in cylinder 30 causes the piston 1 to withdraw the movable electrode 7. Separation of the electrodes obviously permits condenser or group A to charge from the source 12.

It has already been pointed out that the current flowing from the source 12 into the weld is limited by condenser or group B as in patent, No. 2,077,600. According to the present invention, this current is supplemented by the discharge of condenser or group A into the weld. The result is peculiar inasmuch as it is different from a weld produced by the mere added currents from the source 12 and condenser or group A. It appears that the transients or peak voltages of these currents are combined and produce a more favorable voltage of welding current than could otherwise be produced in a system having equivalent condensers and the same current source.

This phenomenon might be explained by the following considerations. Both condensers are connected to and receive their charges from the one battery, but at any given time, one is in a charged state and the other in a discharged state. When the welding circuit is closed at the electrodes, the charging of group B (by the source 12) and the discharge of group A occur simultaneously, thereby producing two currents entering the weld, one from the source (charging group B) and the other from discharging group A.

A graph of the current which passes into and from either condenser shows a high initial voltage of very short duration. Inasmuch as the effect of the charging current and the discharging current of both condensers, respectively, is more than cumulative, as already indicated, it appears that the charging current and the discharging current flow to the weld out of phase with each other, thereby increasing the duration of maximum voltage and resulting in a high temperature. Such high temperature enables the welding of aluminum, gold, zinc, copper, etc., as well as iron in a fashion not dependent upon the electrical resistance of the material itself and somewhat similar to the conflict of cross currents now in medical use.

Although a specific embodiment of the invention has been illustrated and described, it will be understood that various alterations in the details of construction may be made without departing from the scope of the invention, as indicated by the appended claims.

It is also contemplated that the invention, as claimed herein, embraces any other uses to which the claimed circuit is applicable, one of these uses being the heat treatment of metal as described in my co-pending application Serial No. 193,009.

What I claim is:

1. In an electric circuit, a source of current, electrodes connected to said source, a condenser between said source and electrodes and adapted to be charged by and during the flow of current between said electrodes, another condenser connected to such source for constant charging thereby and adapted to discharge, a switch adapted to simultaneously close the circuit to said electrodes and discharge the last named condenser into the circuit, and another switch for simultaneously opening said circuit and discharging the first named condenser.

2. In an electric circuit, a source of current, electrodes connected to said source, a condenser between said source and electrodes and adapted to be charged by and during the flow of current between said electrodes, another condenser connected to such source for constant charging thereby and adapted to discharge, a two-way switch adapted in one position to close the circuit to said electrodes and discharge the last named condenser into the circuit, and in the other position to open said circuit and discharge the first named condenser.

3. In an electric circuit, a source of current, electrodes connected to said source, a condenser between said source and electrodes and adapted to be charged by and during the flow of current between said electrodes, another condenser connected to such source for constant charging thereby and adapted to discharge, means for bringing said electrodes together to close the circuit, a switch for operating said means and discharging the last named condenser into the circuit, and another switch adapted for simultaneously opening said circuit and discharging the first named condenser.

4. In an electric circuit, a source of current, electrodes connected to said source, a condenser between said source and electrodes and adapted to be charged by and during the flow of current between said electrodes, another condenser connected to such source for constant charging thereby and adapted to discharge, means for bringing said electrodes together to close the circuit, a two-way switch adapted in one position to operate said means and discharge the last named condenser into the circuit and in another position to discharge the first named condenser.

GLENN W. WATSON.